United States Patent [19]

Maddux

[11] 3,985,944

[45] *Oct. 12, 1976

[54] APPARATUS AND METHOD FOR INCREASING ELECTRIC POWER OVER A RANGE OF POWER IN AN ELECTRIC GLASS MELTING FURNACE

[75] Inventor: John F. Maddux, Heath, Ohio

[73] Assignee: Owens-Corning Fiberglas Corporation, Toledo, Ohio

[ * ] Notice: The portion of the term of this patent subsequent to June 1, 1993, has been disclaimed.

[22] Filed: Mar. 21, 1975

[21] Appl. No.: 560,920

[52] U.S. Cl. .......... 13/6; 13/23

[51] Int. Cl.² .......... C03B 5/02

[58] Field of Search .......... 13/6, 23, 24

[56] References Cited

UNITED STATES PATENTS 3,683,093 8/1972 Gell et al. .......... 13/6

3,836,689 9/1974 Holler et al. .......... 13/6

*Primary Examiner*—R. N. Envall, Jr.

*Attorney, Agent, or Firm*—John W. Overman; David H. Wilson; Charles F. Schroeder

[57] ABSTRACT

Electric power dissipation in a mass of molten glass is increased in a controlled manner where two or more power sources are each connected to at least two electrodes in the molten glass, by cross connecting the sources through a controller so that electrodes connected to each source and at proper potentials during a portion of each power signal period are connected together. The interconnection enables a substantial increase in voltage applied to localized regions of the molten glass without requiring higher voltage sources. Adjustment of the controller as the conductivity of the glass increases avoids runaway conditions. Interconnection of single and three phase power sources is disclosed.

11 Claims, 6 Drawing Figures

FIG. 3
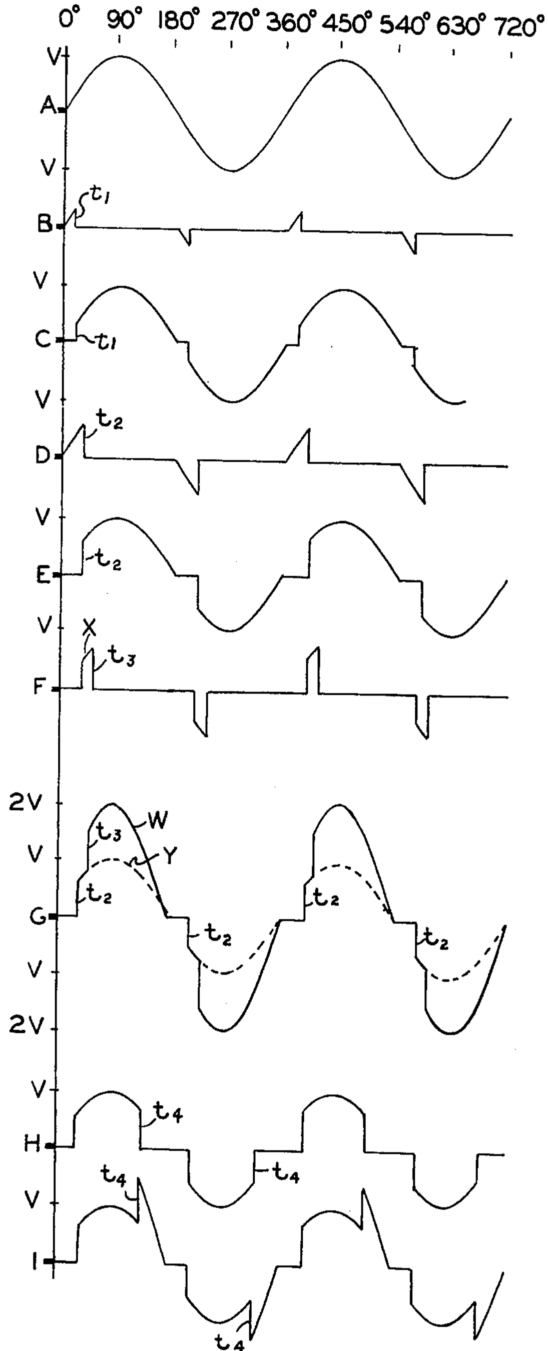
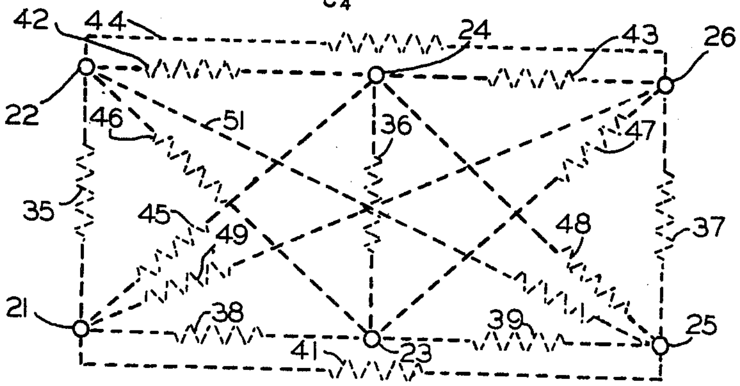
FIG. 4

APPARATUS AND METHOD FOR INCREASING ELECTRIC POWER OVER A RANGE OF POWER IN AN ELECTRIC GLASS MELTING FURNACE

CROSS-REFERENCE TO RELATED APPLICATIONS

This application relates to a refinement of the invention disclosed in my copending U.S. patent application Ser. No. 552,083 entitled "Apparatus and Method for Increasing Electric Power in an Electric Glass Melting Furnace", which was filed Feb. 24, 1975 as a continuation-in-part of my U.S. patent application Ser. No. 475,674 filed June 3, 1974 of the same title.

BACKGROUND OF THE INVENTION

1. Field of the Invention

This invention relates to Joule effect heating of thermoplastic material wherein two or more power sources are each connected to at least two electrodes engaging the thermoplastic and more particularly to the control of the heating derived from current flow within the material and between the sources.

In the discussion of this invention and its various aspects, glass will be employed as the exemplary thermoplastic material upon which Joule effect heating is applied. However, it is to be appreciated that the method and apparatus of this invention lends itself to other thermoplastic materials and therefore the invention should be considered to be generally applicable to such materials.

2. Description of the Prior Art

In the manufacturing of glass, an electric furnace may be utilized to melt a batch of raw materials in a refractory lined furnace chamber. Although hydrocarbon fuel burning furnaces may also be utilized to produce glass, the electric furnace has certain advantages with respect to the problems of air pollution and maintenance of uniform heating.

Typically, an electric furnace will have two or more electrodes submerged in the molten glass which are connected to a source of alternating current. The resistivity of the molten glass transfers the electrical energy of the current flowing between electrodes into heat energy thereby creating Joule effect heating. Molten glass has a negative temperature coefficient and therefore, the resistivity below a critical temperature is sufficiently high so as to limit current flow below a level at which electric melting can be sustained. The power supplied to the furnace chamber is regulated as by time proportioning or by phase controlling the applied voltage with suitable means, typically silicon controlled rectifiers. Since, during normal operation, the control is operating at 92% to 95% of maximum for efficiency of equipment utilization and, in the case of phase control, is conducting over that range of the voltage cycle to obtain a favorable power factor, neither the current flow nor the voltage can be increased significantly to raise the temperature of the molten glass. Thus, for example, when the molten glass falls below the critical temperature, its molten state has not been maintained electrically. Therefore, electric furnaces generally require a plurality of fuel burners positioned to direct radiant heat to the upper surface of the material in the furnace chamber. This radiant heat melts the material until the critical temperature is reached above which the resistivity of the molten glass is low enough to permit sufficient current to flow between the electrodes for normal controlled electric heating furnace operation.

Conditions occur in electric furnace operation where the temperature of the molten glass falls below that critical temperature of the system from which Joule effect heating derived from the sources of electrical power supplying the electrodes is sufficient to raise the temperature. At some given temperature for a given glass the resistance of the glass between electrodes connected to the same source becomes so high that the available voltage is insufficient to provide Joule effect heating at a rate exceeding the heat loss. In the aforenoted related patent applications there is disclosed a method of an apparatus for applying increased voltage across restricted regions of the glass mass by interconnecting electrodes supplied by separate sources to effectively couple those sources in series aiding relationship across glass between electrodes of different mated pairs. In the case of like phased sources of alternating current the interconnection of electrodes of different mated electrode pairs which are of opposite polarity by a low impedance path such as a cable effectively doubles the voltage imposed across the glass mass between the other electrodes of the different mated electrode pairs. The interconnection of differently phased sources can also be effective to impose increased voltage across the glass mass of electrodes connected to the different sources by a series aiding relationship. Thus where sources are shifted in phase 60° and electrodes are interconnected so that their instantaneous voltage values are spaced 120° in phase the effective voltage will be 1.732 times the individual source voltages, where like source voltage magnitudes are involved. The same sources will impose a voltage equal to the source voltages when the electrodes which are connected have their instantaneous voltage values spaced 60° in phase.

The increased applied voltage imposed by the interconnection, while effective to locally increase the power dissipation in the glass between the electrodes, can produce a runaway condition if it is retained as the Joule effect heating is effective to raise the glass temperature. The negative temperature coefficient of the glass will result in a reduction of the resistance in the circuit to which the added voltages are applied to a degree which can exceed the capacity of elements of the electrical power sources, for example beyond the capacity of transformers or silicon controlled rectifiers. Runaway conditions can be avoided by careful monitoring of the electrical parameters or the thermal conditions in the portion of the system affected and by disconnection of the interconnection between sources, as by opening a switch in the cable when the desired result has been realized. The runaway conditions can also be avoided by reducing the source voltages through their individual controllers, however, this also reduces power to the primary heating zones between mated electrodes.

The systems disclosed in the related applications provide various intergroup voltages between electrodes connected to different sources depending upon phase relationships so that some degree of control of the intergroup voltage magnitudes imposed on the glass is afforded by the phasing between electrodes which are interconnected. In one example of three pairs of electrodes in a tank for heating molten glass supplied by delta connected transformer primaries from a three phase source so that the individual supplies are phased 120° apart, the voltages applied to the electrodes contacting the glass can be adjusted in their relationships as by the polarization of the transformer secondaries and the connections to the electrodes so that electrodes of adjacent pairs have voltages which are shifted 60° or 120° in phase with respect to each other. That is a connection can be made between electrodes of each pair of electrodes which have instantaneous voltages shifted 120° in phase. In such an arrangement, the voltage between the other two electrodes is increased to 1.732 times the individual source voltages applied, or by an alternative connection of electrodes having voltages shifted 60° in phase the voltage across the other electrodes will be increased to the value of the individual source voltages applied. These adjustments can be made selectively to provide some degree of interzone applied voltage control. However, they are limited to fixed voltage steps for the interphase voltages derived from any given combination of source voltages connected to the mated electrodes.

An object of this invention is to facilitate the electric heating of thermoplastic materials, particularly materials with a high temperature coefficient of resistance such as the negative coefficient of molten glass.

A second object is to enhance the control of electric currents within molten thermoplastic materials which are derived from a plurality of separate current sources.

A third object is to expand the range of control of interphase electric currents derived from a plurality of polyphase sources and imposed on molten thermoplastic material.

A fourth object is to afford flexibility in shifting from one magnitude of glass throughput to another without loss of thermal control by Joule effect heating.

A fifth object is to effectively utilize the power supply at or near its rated capacity throughout a wider range of operating conditions than heretofore possible.

SUMMARY OF THE INVENTION

In accordance with the above objects the present invention involves connecting electrodes which are supplied from separate current sources which impose their primary current flow and Joule effect heating on heating zones of molten glass located between mated electrodes and providing a control circuit in the connection between sources. The connection including the control circuit when made between one input terminal of each of two mated electrode groups can be adjusted to adjust the effective electrical impedance of the glass mass between electrodes of the mated groups as by adjusting the portion of the alternating voltage wave form resulting from the algebraic sum of the voltages applied to the separate sources which is imposed on a localized region of glass between the groups. This localized glass region is between electrodes connected to the other terminals of the coupled sources.

Effectively, paths of conduction within the glass mass extend between those electrodes of different mated groups of electrodes supplied from separate power sources which are at different potentials. The connection of electrodes of different groups through a controllable circuit shunts the path in the glass mass to a controlled degree, thereby altering the conduction between the electrodes and the voltage drop in that region so that an inverse change in voltage drop in a counterpart region of the glass is realized.

One form of control for the connection is a pair of silicon controlled rectifiers connected in parallel with reverse polarization and with their gate electrodes controlled to render them conductive during a selected portion of the half cycle of imposed voltage in which they are forwardly poled. Alternatively, the shunting connection could be arranged with saturable reactor controllers which provide phase control or could be arranged with either SCR or reactor time proportioned control. In a simple and rather inefficient form, a rheostat control could be utilized in the connection to alter the effective impedance.

BRIEF DESCRIPTION OF THE DRAWINGS

FIGS. 3A through 3I shows various voltage waveforms for the system of FIG. 2 including the power supply, primary zone control, primary zone load, interzone control and interzone load for high and low power settings;

FIG. 4 is a schematic plan view of the inter-electrode current paths in the glass mass contained by the furnace of FIG. 2 employed for discussion purposes in illustrating the invention;

DESCRIPTION OF THE PREFERRED EMBODIMENT

Figure 1:
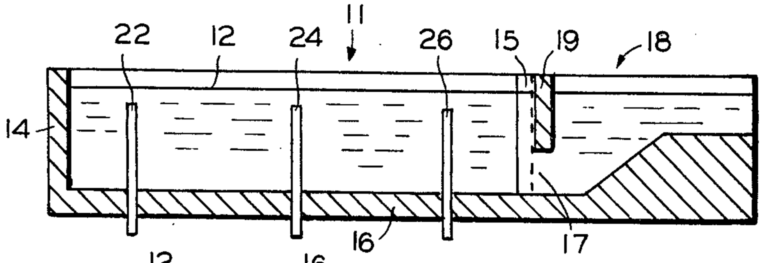
FIG. 1 is a cross-sectional view of a glass melting furnace taken along line 1—1 of FIG. 2.
Figure 2:
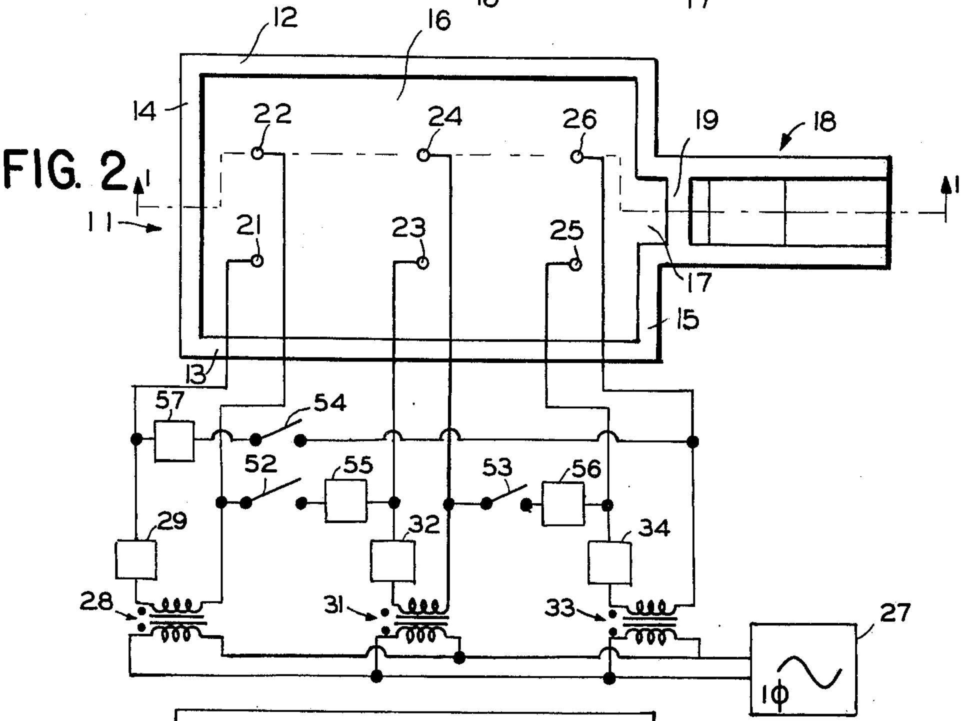
FIG. 2 is a plan view of the glass melting furnace of FIG. 1 showing a schematic wiring diagram of a power supply circuit utilizing sources of like phase to several primary heating zones in the molten glass and interconnecting circuits having individual controllers to control the interzone Joule effect heating according to the present invention.

Referring to FIGS. 1 and 2, there is shown a furnace for melting glass with furnace chamber 11 formed of sidewalls 12 and 13, rear end wall 14, front end wall 15 and floor 16. Batch material is melted in furnace chamber 11 and molten glass is drawn from furnace chamber 11 through throat 17 in front end wall 15 and into channel 18. Channel 18 distributes the molten glass to forehearths, not shown, from which the glass is drawn for the manufacture of various products. Skimmer block 19 extends down into the molten glass flowing through throat 17 to block any floating impurities or batch material from entering channel 18.

Cool batch material is added to furnace chamber 11 as the molten glass is drawn off to maintain a constant level of glass constituents in the furnace. Where the furnace has a crown or cover over the furnace chamber to collect the combustion products from fuel burners and the emissions from the molten glass, batch material is generally added at rear end wall 14 by conventional means, not shown. Furnace chamber 11 may also be open at the top where an upper layer of batch material (not shown) is maintained on the molten glass heated electrically by Joule effect heating. In such an arrangement, that upper layer can cover substantially the entire upper surface of the molten glass to suppress the escape of the emissions. Typically, the batch layer is maintained by spreading batch material from a travelling hoper (not shown). Batch is melted into the underlying hopper of molten glass at the batch-glass interface while the insulating batch layer maintains a relatively cool upper surface. However, when the available electric power is insufficient to bring the furnace up to operating temperature, the additional heat has heretofore been supplied at the upper surface of the glass constituents by fuel burners which melt the batch blanket from the top downward. The present invention eliminates the need for fuel burners by applying additional electric power to the molten glass from the normal electrical heating sources for Joule effect heating.

Electrodes 21, 22, 23, 24, 25 and 26 extend through floor 16 into the molten glass contained in furnace chamber 11. Typically the electrodes are molybdenum rods of about two to three inches diameter. The tops of these electrodes are maintained below the upper surface of the molten glass since exposure to air or unmelted batch material will cause rapid erosion from oxidation and abrasion. Power supply 27 is a source of single phase alternating current which supplies power to each pair of electrodes through a transformer and controller. For example, transformer 28 has a primary winding connected to power supply 27 and a secondary winding connected between electrode pair 21 and 22. Current flows between electrodes 21 and 22 through the circuit formed by the secondary winding of transformer 28, controller 29 and the molten glass. Controller 29 typically may be a saturable reactor or oppositely polarized, parallel, silicon controlled rectifiers which are phase controlled to block current flow during selected portions of each voltage cycle which are usually symmetrical for each half cycle. The current flow between electrodes 21 and 22 is transformed into heat energy by the resistivity of the molten glass to produce Joule effect heating. Electrodes 23 and 24 are connected to the secondary winding of transformer 31 and controller 32 while electrodes 25 and 26 are connected to the secondary winding of transformer 33 and controller 34 to produce Joule effect heating in the middle and front end portions of furnace chamber 11 as electrodes 21 and 22 produce heating in the rear end portion. The voltage waveform of source 27 and the secondaries of transformers 28, 31 and 33 is shown for two complete cycles or 720°, in FIG. 3A. Since all electrode groups receive power from power supply 27, the waveforms are in phase. The voltage between electrodes 21 and 22, 23 and 24, and 25 and 26 will have the same general waveform as FIG. 3A altered by the effect of the blocking action of controllers 29, 32 and 34. FIGS. 3B and 3D represent the blocking action for controllers 29 and 32 for typical settings where somewhat greater Joule effect heating is sought in the zone of electrodes 21 and 22 than for the zone of electrodes 23 and 24. FIGS. 3C and 3E represent the voltage waveform imposed between electrodes 21 and 22, and 23 and 24 when the respective controllers are conductive. Since the load of the molten glass is essentially resistive the voltage waveforms also represent current waveforms in form.

The thermal and electrical characteristics of glass in an electric furnace do not lend themselves to a simple analysis. Glass has a negative temperature coefficient of resistance which follows a curve of resistivity vs. temperature of generally exponential form. Thermal losses from a glass tank result in temperature gradients which tend to cause the glass at the tank sides and bottom to be cooler than that toward the tank interior. Placement of the electrodes is a factor in temperature gradient determinations since the greatest current density in the glass and thus the greatest Joule effect heating occurs in the vicinity of the electrodes. Since the electrodes are surrounded with molten glass, a three dimensional electrical current flow occurs. The greatest electrical current flow should occur in the shortest path between electrodes of different potential. However, while high current density in these regions should result in high heating by the Joule effect, the fluid condition of the molten glass and the resulting convection currents developed distort any thermal profile either in planes parallel to the molten surface or normal to that surface and either transverse or longitudinal of the glass flow to the station from which it is withdrawn from the glass tank. The withdrawal of molten glass and the addition of relatively cold batch also distort the thermal profiles achieved.

As a result of the complexities of the thermal profiles, the resistivity profiles and the electrical current flow paths in a mass of molten glass heated by the Joule effect, observed parameters of operation are quite different from those deduced from a simplistic analysis of the effects of the circuit connections of this invention. In particular, while in the explanation of the effect of the circuit connections below it has been assumed that the resistance of the electrical path in the molten glass between spaced electrodes is directly related to the distance between the electrodes, the results observed indicate that the change in resistance with change in spacing in the regions of concern is proportional to about the fourth root of the distance. This is attributed to the three dimensional current flow, the thermal variations, and the resistivity variations resulting from the negative temperature coefficient of resistance.

The waveforms of FIGS. 3A through E represent conventional phase controlled voltages for the essentially resistive load of Joule effect heated molten glass. For purposes of illustration the phase control provided for two primary heating zones in the molten glass has been shown set to apply greater power to the zone between electrodes 21 and 22 than to the zone between electrodes 23 and 24. Such phase control is accomplished by blocking the voltage of the applied waveform from the respective sources represented by transformers 28 and 31 for a portion of each half cycle of the sine wave voltage. While efficient utilization of the system dictates normal operation over about 95% of the cycle and thus essentially all of each half cycle when viewed graphically on the scale of the illustration, the controller 29 is illustrated as blocking about the first 15° of each half cycle in FIG. 3B so that the applied voltage is effective across the glass between electrodes 21 and 22 over the terminal 165° of each half cycle as shown in FIG. 3C, ie. from 15° to 180° and from 195° to 360° of the cycle. Controller 32 is offset in the phase of its firing from controller 29 to produce an illustrative waveform discussed below. Controller 32 blocks about the first 30° of each half cycle as shown in FIG. 3D and passes the terminal 150° of each half cycle to electrodes 23 and 24 as shown in FIG. 3E.

Temperature control is achieved in the molten glass within a glass tank 11 by segregating the heat sources into regions or zones as defined by the interconnected electrodes. In FIG. 2 electrodes 21 and 22 define a first primary zone, 23 and 24 a second primary zone, and 25 and 26 a third primary zone. Different amounts of power may be applied to the several zones depending upon the heat required for processing the glass constituents therein as in melting batch, refining the molten glass, and conditioning the molten glass for withdrawal from the tank and ultimate utilization. Zone groupings can be of various forms. For example, it may be desirable to have two zones in each rank of electrodes along the longitudinal axis of the furnace (not shown) wherein the outer most electrode on one side of the furnace vertical longitudinal center plane is connected to the same source as the inner most electrode on the opposite side of that plane for both zones. These zones and their control generally are provided to produce a desired thermal profile in the glass along its path of flow to the region from which it is withdrawn. Thus the interconnections between zones to impose added power according to this invention tend to disrupt the normal thermal profiles. This disruption is tolerable to establish temperatures in the molten glass from which desired thermal profiles can be developed by normal electrical zone control.

Ordinarily, only a limited range of electrical control is available in the zones since they are designed to supply power for normal stable operation with conduction in the controllers 29, 32 and 34 over about 90% to 95% of the voltage cycle. Even when a molten glass mass cools to temperatures below those required for the product desired and yet above the critical temperature below which normal electrical heating can be maintained and temperature increased, as where the power to a tank 11 is down for a short period, the recovery with the controllers set at essentially 100% of the voltage cycle may take four to five hours. With the reconnections between zones according to the invention of the aforenoted patent application and the controller conducting essentially 100% of the voltage cycle, the mass of the same quantity in the same thermal system will raise to an operating temperature in fifteen to twenty minutes.

The use of interconnected zones through controllers according to this invention involves establishing a condition which can be controlled to avoid run away. That is, as the negative temperature coefficient of resistance of the glass causes the hotter glass to become of such low resistance as to pass greater currents, the effective voltage between the localized portion of the molten glass affected by the interconnection is reduced by adjustment of the controller. Accordingly, as the current capacity limit of the sources is approached, it is advantageous to retain the normal heating circuit connections and settings for the primary power for each zone while decreasing the conduction of the interzone circuit whereby better thermal control of the system is afforded.

The interconnections between mated electrodes coupled to different sources effectively reduces the impedance in the molten glass in a localized region between the zones. Thus, as between the zone defined by electrodes 21 and 22 and the zone defined by electrodes 23 and 24, potential differences exist between electrodes 22–23 and 21–24 which can be cumulatively applied between one of those electrode pairs by connecting the other of those pairs with a low impedance path which shunts the glass resistance between the other pair. Switch 52 and controller 55 connected between electrodes 22 and 23 applies the sum of the voltage between electrodes 21–22 and the voltage between electrodes 23–24 across the glass between electrodes 21–24 when switch 52 is closed subject to the control of controller 55.

Controller 55 can be of the same form as primary controllers 29, 32 and 34 except that it requires no d-c elimination means as normally employed in such primary controllers. Thus parallel, reverse poled, silicon controlled rectifiers having phase controller firing means synchronized from the applied voltage across the controller and of conventional form can be employed as controller 55. Similarly, localized zones of intensified Joule effect heating between primary zones can be provided by the circuit including switch 53 and controller 56 between primary zones of the electrodes 23–24 and 25–26 and by the circuit including switch 54 and controller 57 between primary zones of the electrodes 21–22 and 25–26.

The effect of connecting electrodes of different zones which are at different potentials now will be illustrated for a tank 11 supplied by three sources which are in phase and connected to three electrode pairs as shown in FIG. 2. For purposes of illustration the simplistic approach of considering straight line conductive paths between electrodes will be assumed and resistance proportional to the length of those paths will be assumed.

Although the output terminals from the secondary windings of transformers 28, 31 and 33 are connected to separate pairs of electrodes, the molten glass forms additional current paths between the electrode pairs. Referring to FIG. 4 there is shown the six electrodes of FIG. 2, electrodes 21 through 26, and the fifteen possible current paths between them taken two electrodes at a time. Current path 35 carries current between electrodes 21 and 22 from the output terminals of the secondary winding of transformer 28 and controller 29 as shown in FIG. 2. The Joule effect heating in path 35 can be expressed in terms of the square of the voltage applied across the path (between electrodes 21 and 22) divided by the resistance. Another primary path of current is that between electrodes 23 and 24 along path 36. In a similar manner Joule effect heating occurs between electrodes 25 and 26 along path 37. Since electrodes 21, 23, and 25 are at the same potential there will be no current flow in current paths 38, 39 and 41 and therefore, no Joule effect heating. Electrodes 22, 24 and 26 are at the same potential so that there is no current flow in paths 42, 43 and 44 and therefore, no Joule effect heating.

Those electrodes at different instantaneous potentials have current flow along their interconnecting paths, even where the electrodes are supplied from different voltage sources, since circuits are available through the sources when they are in a current conducting condition. Ordinarily, those circuits between electrodes directly coupled to different sources include two paths within the molten glass. For example, between mated electrodes 21–22 of source 28 and 29 and mated electrodes 23–24 of source 31 and 32 there are current paths 45 and 46 included in a series circuit from electrode 21, path 45 electrode 24, secondary of 31, controller 32, electrode 23, path 46, electrode 22, secondary 28, controller 29 and return to electrode 21. The in phase voltages are thus summed to twice their individual maximum amplitudes of the sine wave and are a portion of a sine wave represented by the shorter interval of conduction dictated by the phase controlled firing of controllers 29 and 32.

In the illustrative wave forms a condition is set forth wherein controller 32 is conductive at time $t_2$ which is later in the voltage cycle than the initiation of conduction at time $t_1$, in controller 29. Assuming the individual voltages from source 28 and 29 and source 31 and 32 have equal maximum amplitudes and assuming the current paths in the glass mass are resistive and of equal value along the paths 45 and 46, the voltage across each of those paths will each correspond in form to the sine wave of each source beginning at instant $t_2$ of each half cycle of that sine wave as shown by the initial solid line and terminal dashed line wave form Y of FIG. 3G.

If one of the impedances of paths 45 and 46 is reduced as by means of a shunt path external of the glass mass, the voltage applied across the other path is a proportionally greater portion of the algebraic sum of the voltages of the serially connected source 28 and 29 and source 31 and 32. Thus, if an essentially zero resistive shunt is provided across path 46, as by the closure of switch 52 and the placing of controller 55 in conduction, the sum of the source voltages is applied across path 45. A direct connection might be made by switch 52 in a cable or bus between electrodes 22 and 23 as set forth in the aforenoted application, however, as Joule effect heating becomes effective and the resistivity of the higher temperature molten glass in path 45 is reduced, the path resistance reduces and current therein increases. A runaway condition can be created which requires either total elimination of the low impedance shunt by opening switch 52 or reduction of the applied voltages by adjustment to one or both of controllers 29 and 32. Since it is desirable to operate controllers 29 and 32 nearly at 100% of the conduction cycle and it is frequently desirable to maintain some augmenting Joule effect heating above that inherent in the interzone voltages, according to this invention a controller is provided in the shunt path to adjust the portion of the interval in which interzone voltages have a shunt of low resistance across path 46. Effectively the applied voltage wave forms individual to paths 45 and 46 each represented by wave form Y are combined by the onset of the conduction state in controller 55, as at time $t_3$, so that the sine wave maximum amplitude for the balance of the half cycle is shifted from V to 2V across path 45 as represented by the wave form W of FIG. 3G. Controller blocking voltage for controller 55 is represented by waveform X which at time $t_2$ is subjectd to a voltage which is blocked until time $t_3$ as shown in FIG. 3F. Thus, voltage to be blocked is imposed initially in each half cycle at time $t_2$ when both the source circuit controllers are conductive and blocking terminates on the phase controlled firing of controller 55 at time $t_3$. Between those instants a portion of a wave form of the form expressed as $V\sin(\omega t)$ is present on path 46 and blocked by controller 55.

In view of the above, a stepped wave form is imposed on path 45. The first portion of the wave form in the time interval between $t_2$ and $t_3$ is of wave form Y with a step transition at $t_3$ of a voltage for the balance of each half cycle of the form $2V\sin(\omega t)$. In practice, when it is desired to increase Joule effect heating in the glass mass, the controllers 29, 32 and 34 of primary heat zones will be set at or near their maximum so that conduction will occur through about 95% of the voltage cycle. Thus, the wave forms of FIGS. 3A through 3G will approach complete sine waves between respective electrodes and show very little blocking voltage on the controllers. Controller 55 will be arranged to fire virtually at the instant or only slightly after both of controllers 29 and 32 have fired to impose voltage across controller 55. Hence, wave form W will also closely approach a full sine wave for maximum power conditions.

As the interzone path 45 resistance declines the augmented interzone voltage is imposed for a shorter portion of the voltage cycle by retarding the firing of controller 55. The setting of the controller 55 can be independent of the setting of controllers 29 and 32 such that the primary heating zones can continue to have maximum heating conditions imposed as the interzone heating is reduced toward the balanced state wherein half the summed voltages are imposed across each of paths 45 and 46.

The wave forms of FIGS. 3H and 3I respectively illustrate low power settings for controller 55. FIG. 3H shows the blocking voltage of the controller 55 and the voltage across path 46 where controller fires at 135° and 315° of each cycle as illustrated at time $t_4$ for each half cycle. The wave form of voltage on path 46 is thus of the form $V\sin(\omega t)$ for the interval $t_2$ to $t_4$ where the sources are set for wave forms as shown in FIGS. 3B through 3E. Path 45 also has the form $V\sin(\omega t)$ imposed between $t_2$ and $t_4$ and following $t_4$ steps to $2V\sin(\omega t)$. This setting augments the Joule effect heating along path 45 to a much lesser degree than under the conditions of FIG. 3G since the higher voltage is imposed over only a brief portion of each half period and during a declining portion of that wave form to produce a much lower r.m.s. value of voltage on path 45.

The positioning of the electrodes in furnace chamber 11 of FIG. 2 is a function of the resistivity of the molten glass, the total power available from power supply 27 and the operating temperature required to be maintained for a predetermined number of electrodes and chamber size. In addition, there will be a temperature gradient, a decrease in temperature from the center portion of furnace chamber 11 to sidewalls 12 and 13 and front end wall 15 due to the heat losses through these walls and a sharp decrease in temperature at rear end wall 14 when the cool batch material is added at that region, which will cause a difference in resistance between two pairs of equally spaced electrodes. Therefore, it should be appreciated that provisions can be made for selective connection of different electrodes provided their sources place them at different instantaneous potentials. In the use of sources supplying single phase connected in the manner of FIG. 2, connections can be made to shunt path 48 through switch 53 and controller 56 to control the imposed voltage and current flowing in path 47 and connections can be made through switch 54 and controller 57 to shunt path 49 and increase in a controlled manner the r.m.s. voltage and current across path 51. While the resistance of the several paths 47, 48, 49 and 51 may be different from those of paths 46 and 45 the principles of operation by means of controllers 56 and 57 correspond to those of 55. Further, where desired, combinations of two or more of these circuits can be employed to impose Joule effect heating on several paths simultaneously.

Alternative location of the paths within the molten glass mass to which concentrated Joule effect heating can be applied can be accomplished by altering the connections of FIG. 2 from those shown. For example, if the shunt paths containing controllers 55, 56 or 57 are connected to respective counterpart electrodes to those to which they are connected, the intensified heating will be imposed along counterpart diagonals. Thus, switch 52 and controller 55 can be connected between electrodes 21 and 24 to control intensified heating on path 46, switch 53 and controller 56 can be connected between electrodes 23 and 26 to control intensified heating on path 48, and switch 54 and controller 57 can be connected between electrodes 22 and 25 to control intensified heating on path 49. If the controlled, intensified, interzone heating is desired, parallel to sidewalls instead of across diagonals of the electrode array, the polarity of the secondary of transformer 31 can be reversed to cause electrode 23 to have different instantaneous potentials than electrodes 21 and 25 and electrode 24 to have different instantaneous potentials than electrodes 22 and 26. The controlled shunts can then be imposed between electrodes on the same side of the furnace to control the intensified Joule effect heating along the opposite side.

Figure 5:
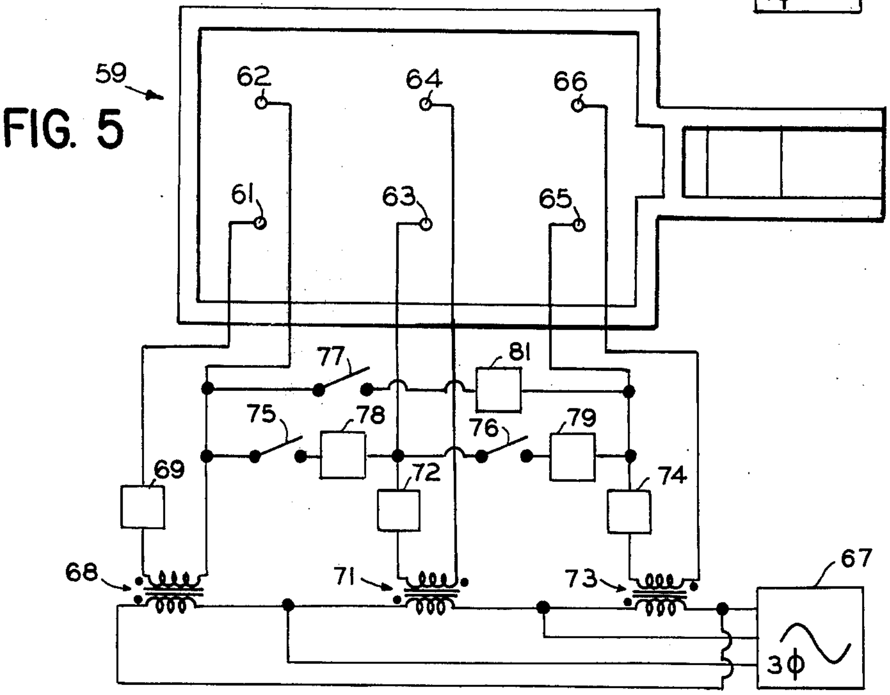
FIG. 5 is a plan view of a glass melting furnace of the form shown in FIGS. 1 and 2 showing a schematic wiring diagram of a power supply circuit utilizing a three phase power supply with individual phases to several primary heating zones in the molten glass and interphase connections including individual controllers to control the interzone Joule effect heating according to this invention.

The controlled, intensified, interzone, Joule effect heating by means of a controlled shunt between electrodes connected to different sources can also be applied to polyphase systems. Referring to FIG. 5, there is shown an electric furnace substantially identical to the furnace of FIG. 2 with furnace chamber 59 and electrodes 61, 62, 63, 64, 65 and 66. However, power supply 67 is a source of three phase alternating current which supplies power to each pair of electrodes through a transformer and controller. The first phase of alternating current is applied to electrodes 61 and 62 through the transformer 68 and controller 69, the second phase is applied to electrodes 63 and 64 through transformer 71 and controller 72 and the third phase is applied to electrodes 65 and 66 through transformer 73 and controller 74. The interelectrode voltage wave forms for the electrode pairs of FIG. 5 are shown in FIG. 6B as being 60° out of phase as derived through polarization of the transformer secondaries as indicated by the dots on FIG. 5 from transformer primary voltages which are 120° apart as shown in FIG. 6A. Assuming a peak voltage of V, wave form D for electrodes 61-62 may be designated as $V\sin(\omega t)$, wave form E for electrodes 63–64 as $V\sin(\omega t + 60°)$ and wave form G for electrodes 65–66 as $V\sin(\omega t - 60°)$ where + 60° and − 60° are phase angles of the second and third phases shifted 180° in transformers 71 and 73.

An interconnection including normally open switch 75 connects electrode 62 with electrode 63. When additional electrical power is required, switch 75 may be closed to short current path 46 of FIG. 4 thereby decreasing the total resistance and increasing the voltage presented to the inter-electrode voltages to increase current flow. The increased current flow creates more power dissipation in the area between electrode pair 61 and 62 and electrode pair 63 and 64. An interconnection including normally open switch 76 connects electrode 63 with electrode 65. Switch 76 may be closed to short current path 39 of FIG. 4 thereby decreasing the total resistance presented to the inter-electrode voltages to increase current flow. The increased current flow creates more power dissipation in the area between electrode pair 63 and 64 and electrode pair 65 and 66. A third interconnection including normally open switch 77 connects electrode 62 with electrode 65. Switch 77 may be closed to short circuit current path 51 of FIG. 4 to create more power dissipation in furnace chamber 59. It will be appreciated that the interconnection between electrodes 62 and 63 may alternately be made between electrodes 61 and 64 that the interconnection between electrodes 63 and 65 may alternately be made between electrodes 64 and 66 and that the interconnection between electrodes 62 and 65 may alternately be made between electrodes 61 and 66 to produce the same power increases as are produced by the illustrated interconnections. Further, the electrode pair voltage arrangements can be shifted in conunction with appropriate interconnections by switches corresponding to 75, 76 and 77 to position the region of intensified Joule effect heating as desired, in the manner discussed with respect to FIG. 2.

Figure 6:
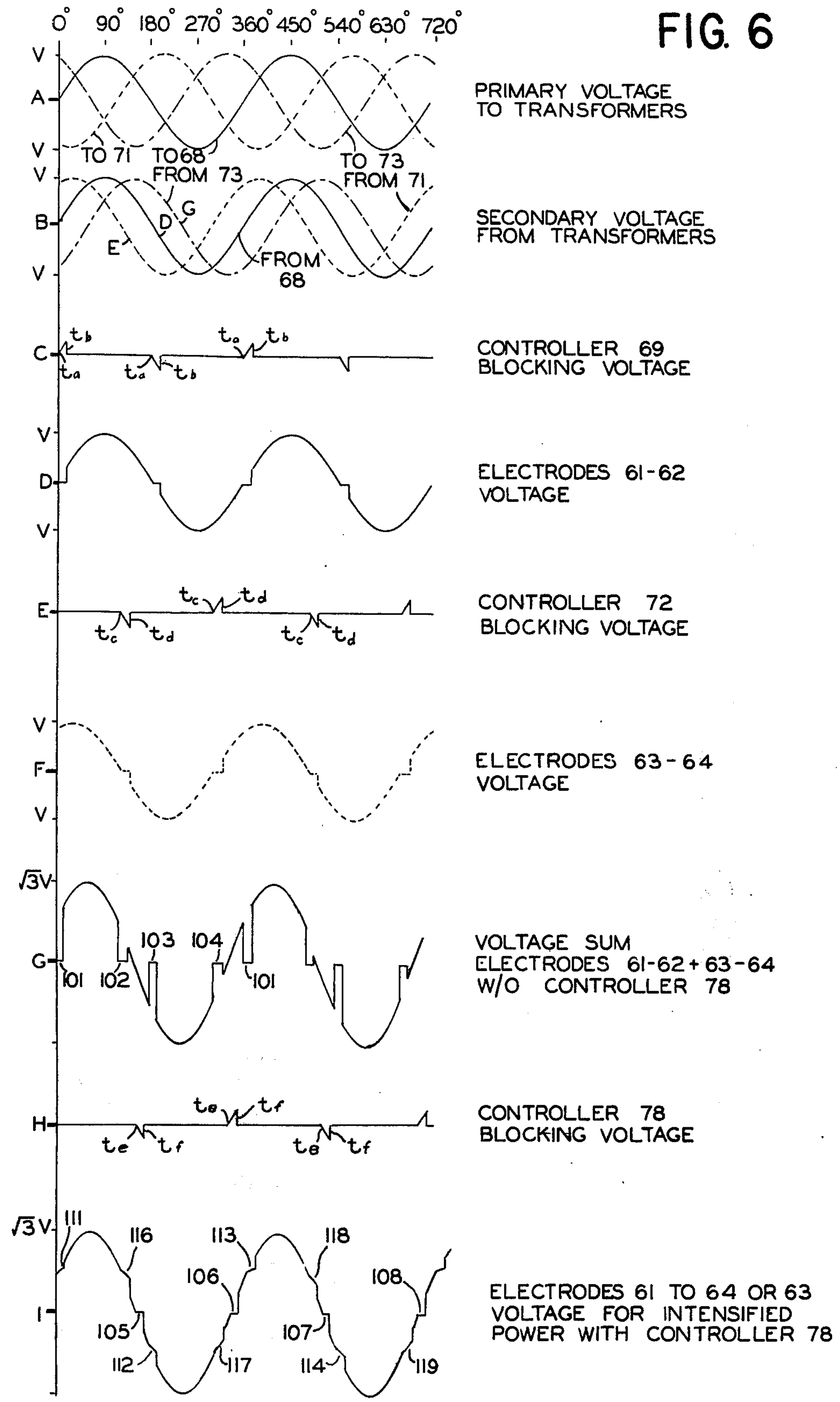
FIGS. 6A through I show voltage waveforms for one controlled, polyphase interzone Joule effect heating as derived from the circuit of FIG. 5 showing the waveforms for the three phase supply, the transformer secondary voltages including the voltage supplied to the two zones considered, their primary zone control, their primary zone loads (FIGS. 6D and 6F), the interzone control and the interzone load.

As in the case of FIGS. 2 and 3, the wave forms of FIG. 6 for individual heat zones between grouped or mated electrodes in the glass mass can be viewed as controller blocking voltages and load voltages applied to the glass mass. FIGS. 6C and E represent the blocking voltages of controllers 69 and 72 respectively as they are effective on the voltages applied from secondaries 68 and 71 as shown in FIG. 6B. The resultant voltages on the glass mass between electrodes 61 and 62 (path 35 of FIG. 4) and between electrodes 63 and 64 (path 36) are shown in FIGS. 6D and 6F when the primary Joule effect heating zones are operated with the controller near their maximum settings. During the interval between the beginning of each half cycle and the triggering of the controllers the controllers appear as an effective open circuit as between instants $t_a$ and $t_b$ for controller 69 and between $t_c$ and $t_d$ for controller 72. Adjustment of the length of these intervals provide primary Joule effect heating adjustment. Intensified Joule effect heating can be realized by interconnecting the primary heating zones with a low impedance between an electrode of each zone. The greatest intensification of Joule effect heating is realized by connecting those electrodes having instantaneous voltages separated by the greatest phase difference, in the example electrodes whose instantaneous voltages are 120° apart rather than electrodes whose instantaneous voltages are 60° apart. The coupling of electrodes having a 120° phase separation of instantaneous voltages of equal maximum amplitude produces a voltage whose maximum amplitude is $\sqrt{3}$ or 1.732 that of the individual voltages and of a form shown in FIG. 6G.

As shown in FIG. 6G the sine wave form across the diagonal paths 46 and 45 for the three phase supply embodiment of FIG. 5 involves sharp transitions during the intervals the controllers are non conductive. These transitions will be more fully appreciated from a consideration of the conductive paths within the glass mass during the several states of controller conduction which are encountered during a cycle of applied voltage. When the reference voltage of transformer 68 begins its cycle and until time $t_b$, controller 69 is blocking while controller 72 is conducting and the open circuit of 69 prevents application of potential between the electrodes 61–62 and 63–64 as shown at 101 of FIG. 6G. After time $t_b$ controller 69 becomes conductive and controller 72 continues to conduct so that a series aiding relationship of voltages from 68 and 73 produces a partial sine wave form through path controller 69, electrode 61, glass mass path 45, electrode 64, secondary 71, controller 72, electrode 63, glass mass path 46, electrode 62, secondary 68 and return to controller 69. This path is maintained until time $t_c$ at which time controller 72 enters its blocking state and the wave form steps to its origin at 102 of FIG. 6G. At time $t_d$ controller 72 becomes conductive in the direction opposite that of the previous half cycle of conduction and the wave form of FIG. 6G again steps to the sine form made up of the summed voltages from 68 and 71. Next, controller 69 enters a blocking state as the voltage from 68 crosses its neutral value and maintains that state for an interval $t_a - t_b$ during which the composite voltage steps to neutral at 103. The composite voltage returns to the sine of the summed voltages until controller 72 enters a blocking voltage state as the voltage from 71 passes through neutral to a positive value for another $t_c - t_d$ interval in which the composite voltage is stepped to neutral at 104. After time $t_d$ the terminal portion of the cycle is completed by a transition of the composite through its neutral to another 101 step at the initiation of a new reference phase cycle from 68.

When switch 75 is closed the inter-electrode voltages between electrodes 61 and 62, shown as FIG. 6D, and electrodes 63 and 64, shown as FIG. 6F, are star connected across current path 45 of FIG. 4. The addition in these voltages, $V\sin(\omega t) + V\sin(\omega t + 60°)$, produces the wave form shown in FIG. 6G between electrodes 61 and 64 which may be designated as $1.732\ V\sin(\omega t + 30°)$. When switch 76 is closed the inter-electrode voltages between electrodes 63 and 64 and electrodes 65 and 66 are star connected across current path 43 of FIG. 4. The addition of these voltages, $V\sin(\omega t - 120°) + V\sin(\omega t - 60°)$, produces a wave form, not shown, between electrodes 64 and 66 which may be designated as $1.732\ V\sin(\omega t - 90°)$. Finally, when switch 77 is closed, the inter-electrode voltages between electrodes 61 and 62 and electrodes 65 and 66 are star connected across current path 49 of FIG. 4. The addition of these voltages, $V\sin(\omega t) + V\sin(\omega t - 60°)$, produces the wave form between electrodes 61 and 66 which may be designated as $1.732\ V\sin(\omega t - 30°)$.

Where the three inter-electrode voltages are in phase, as shown in FIG. 3A, the voltages can be added together on current paths 45, 46, 47, 48 49 and 51 to produce a voltage of greater magnitude than any one voltage taken alone. However, where the inter-electrode voltages are phased, as shown in FIG. 6B, the voltages will add together to produce a phase shift and a lesser increase in magnitude, a factor of $\sqrt{3}$ or 1.732 as shown in FIG. 6G, than the in phase voltages, a factor of two as shown in FIG. 3G, along the same current path. The phased voltages will add together with an increase in magnitude along current paths 39, 43, 45, 46, 49 and 51 and will also add together with only a phase shift along current paths 38, 41, 42, 44, 47 and 48. Therefore, when the phased voltages are utilized, the decrease in power along some of the current paths as compared with in phase voltages is offset by additional power along current paths where no current flowed with in phase voltages so that the total power dissipated by the polyphased inter-electrode voltage is substantially the same as with voltages in phase. However, when the closing of switches 75, 76 and 77 reduces the total circuit resistance and places the inter-electrode voltages star connected along the current paths where no current flowed with in phase voltages, there is a greater power increase than with in phase voltages.

If 100% conduction is assumed in all controllers 69, 72 and 78, and the switch 75 of FIG. 5 is closed, there is an approximately 26.5% increase in power calculated with the above assumptions as compared with an approximately 17% increase in power calculated with those assumptions when the switch 52 of FIG. 2 is closed under 100% conduction conditions. However, if the switch 76 of FIG. 5 is closed under the assumed conditions, there is a power increase of approximately 17% since the inter-electrode voltages between electrodes 63 and 64 and electrodes 65 and 66 are star connected across the current path 43 of FIG. 4 which is shorter than the current path 45 of FIG. 4 which receives the increased current when the switch 75 is closed. This power increase is of approximately the same magnitude as the increase in power when the switch 53 of FIG. 2 is closed since both the voltage across and the resistance of the current path have been decreased in the star connected polyphase circuit. Finally, if the switch 77 is closed for 100% conduction, there is a power increase of approximately 14% as compared with a power increase of approximately 9% when the switch 54 of FIG. 2 is closed.

While greater total power is developed with an interconnection of polyphase mated electrodes, the greatest localized power and thus the most intensified Joule effect heating is realized with interconnected single phase systems of the type discussed with respect to FIG. 2 since the greatest potential between electrodes coupled to different sources can be developed from the 180° phase difference between properly chosen electrodes of the two groups. Thus when an interconnection is made between electrodes connected to different sources the use of a controller according to this invention is most effective for interconnections between sources of the same phase as a means of reducing the voltage developed from such sources as the temperature increases and the resistance of the localized glass mass affected is reduced. In the case of interconnected polyphase sources the voltages which can be developed between electrodes supplied by different sources are reduced as a function of the phase difference between those voltages. Thus a connection between voltages 150° out of phase will impose a greater voltage than one between voltages 120° out of phase. As illustrated with respect to the system of FIG. 5 when two groups are 60° out of phase as viewed from electrodes along a common side of the electrode array they are 120° out of phase as viewed between electrodes of different groups on opposite sides of the array.

As the phase difference in the instantaneous values of voltage on the electrodes defining the zone to which intensified power is applied by the interconnection of separate sources is reduced the range of voltage which can be controlled by a controller in the interconnection is reduced. However, the need for such a controller is also reduced where reduced voltages are developed since there is less tendency to develop a runaway condition in the temperature-resistance relationship of the molten glass. It is most advantageous to provide a controller in the interconnection between electrodes of the different mated groups having the greatest phase difference in instantaneous voltage.

In the three phase system of FIG. 5 this has been done by providing a controller between electrodes having instantaneous voltages 120° apart as controller 78 in the interconnection of switch 75 between electrodes 62 and 63, controller 79 in the interconnection of switch 76 between electrodes 63 and 65, and controller 81 in the interconnection of switch 77 between electrodes 65 and 62. The wave forms of the blocking voltage and the voltage for intensified power is illustrated for controller 78 and the molten glass region of path 45 between electrodes 61 and 64 as shown in FIGS. 6H and I.

Voltage across the interconnection of switch 75 and controller 78 is shown in FIG. 6I. The phase angle control of controllers typified by 78 is such that they have a sustained gate signal for the remainder of each half cycle of applied voltage following the instant of phase angle firing. Accordingly, the firing control for the controllers is synchronized on the wave form of the voltage applied to the controller and for high levels of intensified voltage the firing occurs early in each half cycle such that the controller is conductive over about 95% of the cycle. In FIG. 6H blocking occurs between intervals $t_e$ and $t_f$ where $t_e$ is the beginning of the half cycle of applied voltage and $t_f$ is the instant the desired phase angle is achieved. The voltage applied between electrodes 61 and 62 is at the neutral level during the blocking interval of the controller 78 as shown at 105, 106, 107 and 108. At time $t_f$ those intervals terminate and the voltage steps to the value for the phase angle of firing which is determined from the basic equation 1.732 V ($\omega t$). At this time the current path is effectively through controller 69, electrode 61, glass mass path 45, electrode 64, secondary 71, controller 72, controller 78, switch 75, secondary 68, controller 69 and return to electrode 61. When controller 69 is in its blocking state controller 72 is conducting and controller 78 has a sustained gate signal and remains conductive placing electrode 62 at essentially the same potential as electrode 63 so that the voltage of transformer 71 sustains conduction in the controller 78 as derived from the wave form of FIG. 6F as shown at intervals $t_a$ to $t_b$, sections 111, 112, 113 and 114 as elements of the sine wave form corresponding to FIG. 6F. After controller 69 enters conduction, the wave form of the voltage across electrodes 61–64 returns to its conventional sine wave form until time $t_c - t_d$ when controller 72 is blocking at which time the sine wave form of FIG. 6D is effective at 116, 117, 118 and 119 as elements of sine wave corresponding to that of FIG. 6D. The current paths during these intervals are through the sustained controller 78 as from secondary 68 through controller 69 when it is on or controller 72 when it is on, electrode 61, glass mass path 38, electrode 63, controller 78, switch 75 and back to secondary 68.

It should be noted that only one trigger signal for each half cycle of the composite voltages is required since an alternate conduction path is maintained while the individual primary controllers are blocking. The sustaining signal is effective even if the applied voltage falls below the sustaining voltage value for the anode-cathode of the conducting power SCR (not shown) in controller 78 since a pilot SCR (not shown) maintains a sustaining gate signal on the power SCR throughout that portion of the half cycle following the phase angle firing of the pilot SCR to fire the power SCR.

The blocking of conduction through the low impedance path between electrodes of different groups of electrodes can be by phase control gating or by magnitude control gating. The reference signal from which the block is released, as at time $t_f$ of FIG. 6H, can be one of the component wave forms of the composite wave, for example taken at the transformer secondaries, or a composite of wave forms taken from those secondaries, or the actual composite imposed as in FIG. 6G. Any of these references can be employed for conventional phase control. Alternatively, blocking can be released as the reference wave form achieves a gating level. Again the reference can be a component or the composite wave. The blocking interval for the composite in any of the available controls should be adjustable over a substantial portion of each half cycle and thus beyond the first 90° of each half cycle. Preferably, the greatest flexibility of control should be provided by providing a range of blocking control in the interzone controller from effective full conduction (essentially 100% conduction) to an effective negligible conduction (essentially 100% blocking) with either relatively small incremental steps between those limits or a continuously variable control between those limits.

The wave forms illustrated in FIG. 6 have assumed firing of the controls for the respective electrodes during a major portion of the voltage cycle. Where a reduced interval of firing is utilized a wider notch will appear in the wave forms and the composite wave forms between electrode zones will have several notches which can be of different widths. This aspect of operation has not been illustrated.

As reduced power is required and the intensification feature is retained, the composite waveform will exhibit a smaller portion of the sine wave having a magnitude of maximum amplitude 1.732V as in the case of the reduced portion of the wave form having a magnitude of maximum amplitude of 2V illustrated in FIG. 3I. Further, the wave forms utilized for each zone have been of the same frequency in order that phase relationships be maintained. Equal voltages have been assumed to be imposed from each source to the zone electrodes although those voltages can be varied and in some instances, where different degrees of normal heating are utilized, they may be varied either by employing different peak voltages or by control of the firing phase in the respective controllers. Variations in the voltage values of the several sources are tolerable in the interconnections of the present invention although the maximizing of power suggests each source controller be operated at essentially 100% of the wave form and thus voltage differences ordinarily will be present when the inter-connections of the invention are made only if peak values of applied voltage from the several sources differ.

While operation of the controlled augmenting circuit has been discussed in the context of increasing the temperature of the entire mass of glass constituents in the tank as occasioned by a temperature drop due to a loss of power for an interval, it is to be appreciated that the invention also contemplates the rapid adjustment upward of the temperature of cool localized regions in the molten glass. When a cool region is sensed, as by a reduction in the current passed by one of the controllers 29, 32, or 34, by an optical pyrometer for a hot top molten glass mass, or by thermocouples in the tank walls or within the mass (not shown), increased voltage can be imposed either in that region or in its vicinity on a localized basis to develop greater Joule effect heating. As represented in FIG. 4 by the phantomed resistances between the electrodes, the region in which the effective serial connection of the sources normally supplying two furnace zones can be established selectively, for applying extra heating power in the general area of the resistances, by selection of the electrode connections and source polarizations to the zones involved. For example, if a cold region was detected along the diagonal between electrodes 21 and 24, the increased voltage can be imposed on the molten glass in that region by connecting electrodes 22 and 23 as by switch 52 of FIG. 2. This voltage would be imposed across the resistance represented as 45 in FIG. 4 and would result in increased Joule effect heating in that zone even while the Joule effect heating in the zones represented by resistances 35, 36 and 37 was maintained.

The preceding discussion has been directed to paired electrodes supplied power from individual sources. It should be appreciated that other electrode groupings can be employed with one or more sources. For example, the invention is applicable to a three electrode grouping with ranks of three electrodes across the furnace width and the center electrode of one polarity while the outer electrodes are of the opposite polarity. Further, arrays of electrode groups of greater numbers than three and in other than linear alignments can be employed with the interconnections for increased Joule effect heating according to this invention.

In summary, the present invention applies controlled amounts additional power to an electric glass melting furnace over that available with normal operation. When the temperature of the molten glass has decreased below the critical temperature at which the available normal operating power is not sufficient to bring the molten glass back to the operating temperature, the connections of this invention are particularly advantageous. The increase in power is accomplished by connecting together one electrode from each of two current source outputs which are at different potentials during at least a preponderant portion of each voltage signal period thereby shorting a current path through the molten glass and decreasing the total resistance presented to the inter-electrode voltages. When the additional power has increased the temperature of the molten glass above the critical temperature, the controller in the connection can be set to fire later in the half cycle of the composite wave form while normal heating is maintained.

While there is explained and illustrated the preferred embodiment of my invention, it is to be understood that many variations in the method of and apparatus for providing additional power to raise the temperature of the molten glass for normal electric melting are within the concept of my invention. Accordingly, it is to be appreciated that the invention may be practiced otherwise than as specifically illustrated and described and that the electrode arrangements in the glass tank, the electrode zone interconnections, and the source arrangements are merely exemplary and are not to be read in a limiting sense.

I claim:

1. Apparatus for heating molten glass by Joule effect comprising a receptacle for the molten glass; an array of electrodes in said receptacle adapted to electrically conductively engage the molten glass; at least two groups of mated electrodes in said array; an individual source of alternating current electrical power electrically coupled to each of said mated groups; a conductive path selectively coupled between one of said electrodes of two of said groups; and means in said conductive path to selectively alter the electrical conduction of said path over a range of conduction.

2. Apparatus according to claim 1 wherein said means to selectively alter the electrical conduction of said path is adjustable over a range between an effective full conduction and an effective negligible conduction.

3. Apparatus according to claim 1 wherein said means to selectively alter the electrical conduction of said path is an adjustable blocking device for blocking selective portions which are essentially symmetrical on both sides of the neutral axis of the alternating current which tends to flow in said path.

4. Apparatus according to claim 1 wherein said means to selectively alter the electrical conduction of said path is parallel connected reverse poled, controlled rectifiers and gating means for adjustable phase angle controlled firing of said rectifiers.

5. Apparatus according to claim 1 wherein said individual sources of alternating current electrical power coupled to mated groups of electrodes coupled by said conductive path are of the same frequency and phase and wherein said electrodes coupled by said path have opposite instantaneous voltages imposed a preponderance of each cycle by their respective sources supplying their respective mated groups.

6. Apparatus according to claim 1 wherein said individual sources of alternating current electrical power coupled to the mated groups of electrodes coupled by said conductive path are of the same frequency and are shifted in phase with respect to each other.

7. Apparatus according to claim 6 wherein said electrodes coupled by said path have opposite instantaneous voltages imposed a preponderance of each cycle by their respective sources supplying their respective mated groups.

8. Apparatus according to claim 6 wherein said individual sources are applied to molten glass between said electrode groups coupled by said path to impose a composite alternating current electrical power; and wherein said means to selectively alter the electrical conduction of said path is an adjustable blocking device for blocking selective portions which are symmetrical on both sides of the neutral axis of the composite alternating current.

9. Apparatus according to claim 8 wherein said means to selectively alter the electrical conduction of said path is parallel connected, reverse poled, controlled rectifiers and gating means for adjusting the phase angle controlled firing of said rectifiers with respect to the composite electrical power.

10. The method of increasing the Joule effect heating of a molten glass mass having a plurality of primary heating zones in the glass mass, each primary zone being between a group of mated electrodes supplied by a source of alternating current electrical power individual to the respective group, comprising the steps of electrically interconnecting electrodes of different groups with a conductive path external of the molten glass mass and reducing the conduction in the conductive path as the electrical conductivity of the molten glass between the primary heating zones increases.

11. The method according to claim 8 wherein the step of reducing conduction in the conductive path includes blocking conduction in the path for generally symmetrical portions of opposite polarity half cycles of the alternating current power imposed between the primary zones.

* * * * *